United States Patent [19]

Brown

[11] Patent Number: 4,727,728

[45] Date of Patent: Mar. 1, 1988

[54] BUS AIR CONDITIONING UNIT FOR ROOF TOP MOUNTING

[75] Inventor: Ronald W. Brown, Minneapolis, Minn.

[73] Assignee: Thermo King Corporation, Minneapolis, Minn.

[21] Appl. No.: 493,898

[22] Filed: May 12, 1983

[51] Int. Cl.[4] ............................................. B60H 1/32
[52] U.S. Cl. ...................................... 62/244; 62/298; 312/257 A; 312/257 SM
[58] Field of Search ................. 62/239, 244, 298, 265; 312/257 A, 257 SM, 239, 100, 328; 165/76

[56] References Cited

U.S. PATENT DOCUMENTS

| | | | |
|---|---|---|---|
| 777,076 | 12/1904 | Chaffin | 62/298 |
| 2,751,760 | 6/1956 | Williams, Jr. | 62/298 X |
| 2,799,143 | 7/1957 | Weigel | 62/244 X |
| 3,357,763 | 12/1967 | Toper | 62/298 X |
| 3,766,749 | 10/1973 | Livesay | 62/298 X |
| 3,889,486 | 6/1975 | Hinckley et al. | 62/298 X |
| 4,098,093 | 7/1978 | Czyl | 62/243 |
| 4,201,064 | 5/1980 | Krug et al. | 62/239 |
| 4,242,876 | 1/1981 | Cooper et al. | 62/89 |
| 4,307,655 | 12/1981 | Parks et al. | 98/2.14 |

*Primary Examiner*—William E. Tapolcai
*Attorney, Agent, or Firm*—E. C. Arenz

[57] ABSTRACT

An air conditioning unit for mounting on the roof of a bus is comprised of a vehicle air conditioning section 12 and a separator condenser section 14 which in their installed relation are fastened together along the line 52, the central part of the unit having a standing space 38 between the operating parts of the air conditioning section and the condenser section to facilitate ready access from that standing space to both of the sections. Additionally, side spaces are provided along both the sides of the unit by means of detachable panels spaced outwardly from the interior parts of the sections so as to provide space for routing of refrigerant and other lines.

9 Claims, 5 Drawing Figures

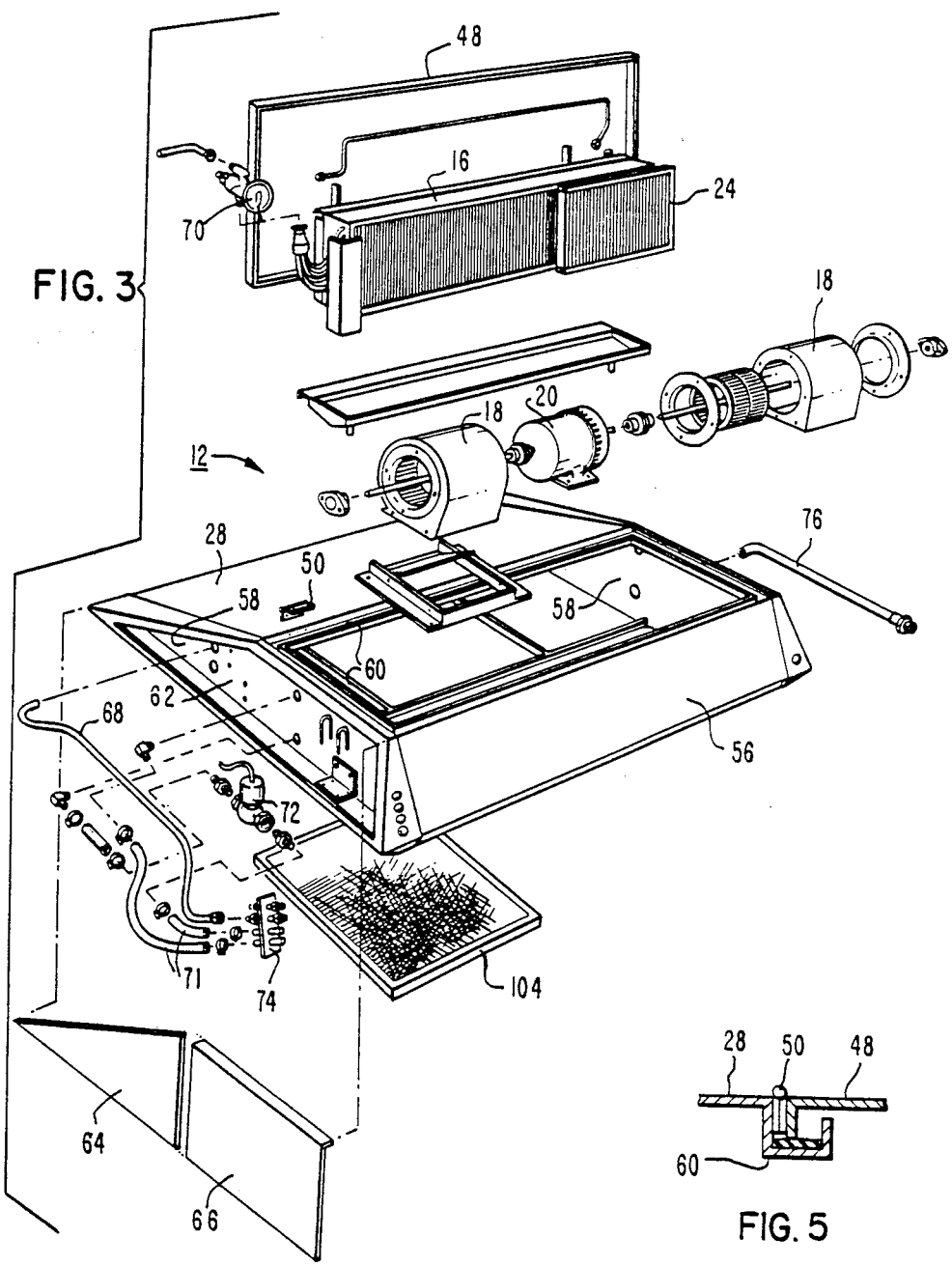

BUS AIR CONDITIONING UNIT FOR ROOF TOP MOUNTING

BACKGROUND OF THE INVENTION

This invention pertains to the art of the construction of an air conditioning unit to be mounted on the roof of a bus.

Conventional bus units of which I am aware are constructed in a way and have the parts thereof arranged such that there are a number of deficiencies in my estimation. While there are other deficiencies, one of the main deficiencies relates to difficulty of service and maintenance of the relatively large unit located on top of a bus. Some of the advantages of my invention in obviating such specific deficiencies will be noted hereinafter, but generally the aim of my invention is to provide a unit with components advantageously arranged for aerodynamic design purposes, each of manufacturing, shipping, installation, service and maintenance, while also providing efficient operation.

SUMMARY OF THE INVENTION

In accordance with my invention, the unit is of modular construction which includes a vehicle air conditioning section having a first enclosure part which is substantially water tight and houses evaporator coil means and the evaporator fan means, this section having detachable side panel means spaced outwardly from the sides of the first enclosure part to provide side spaces therebetween; and a separate condenser section housing condenser fan coil means and condenser fan means for circulating ambient air through the condenser coil means, the two sections being adapted for attachment to form a single unit, and the generally central part of the unit is upwardly open over an area sufficiently extensive to provide standing room for a person to permit working on the unit from the central part.

Additional features include the provision of a hinged cover for the part of the first enclosure part containing the evaporator coil and evaporator fan means to permit easy access thereto from the standing location at the central part of the unit. The condenser section also has detachable side panels spaced sideways from the main side plates of the condenser section so that there are accessible side spaces to the unit from both sides for substantially the front to rear length of the unit. These side spaces accommodate routing refrigerant lines, heater lines, and electrical lines therealong with ready access thereto, and provides flexibility with respect to making connections with lines which extend through the bus roof and routed to remotely located components, such as the refrigerant compressor typically driven from the bus engine.

Other features will be explained in connection with the description of the specific construction of the unit.

DRAWING DESCRIPTION

FIG. 3 is an exploded isometric view of the vehicle air conditioning section of the unit with most of the main parts shown;

FIG. 5 is a fragmentary cross section corresponding to one taken along the line V—V of FIG. 2.

DESCRIPTION OF THE PREFERRED EMBODIMENT

Figure 2:
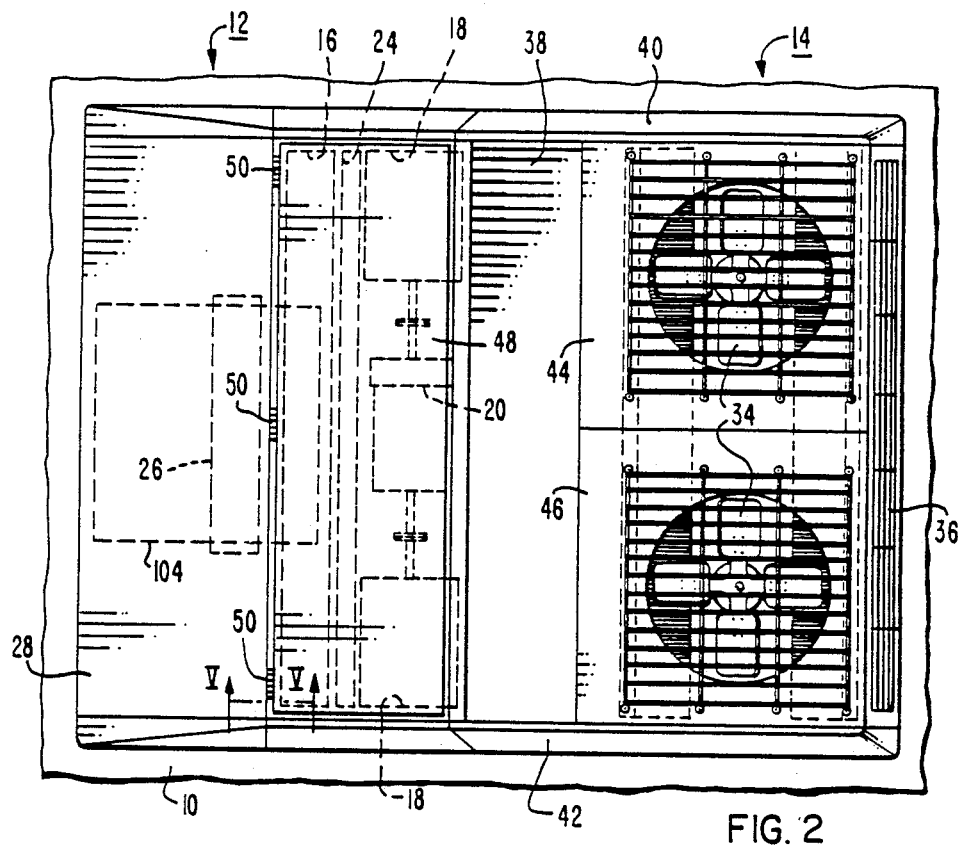
FIG. 2 is a somewhat diagrammatic top view of the unit of FIG. 1.

The unit of the invention is mounted on the top of a bus roof 10 and comprises two main sections, the vehicle air conditioning section generally designated 12 and forwardly on the bus roof, that is, with respect to the direction of movement of the bus, and the condenser section generally designated 14.

The major components in the evaporator or air conditioning section 12 include the evaporator coil 16 and a pair of evaporator blowers 18 driven by electric motor 20 the blowers circulate air from the vehicle interior for conditioning by the evaporator and then returning it through appropriate outlet ducts 22 to whatever air distribution means is provided in the vehicle. The direction of flow of this vehicle air is as indicated by the solid arrows in FIG. 1. Where the climate warrants, a heater coil 24, fed by hot water from the bus cooling system, is also provided in the air conditioning section.

In the preferred arrangement, a control panel 26 having electrical switches and other manually operable controls is centralized immediately forward of the evaporator coil in the air conditioning section and below the downwardly sloping front panel 28 of the section.

The basic elements in the separate condenser section 14 include forward and rearward condenser coils 30 and 32, respectively, and a pair of upwardly directed condenser fans 34. The air flow through the condenser coil is as indicated by the dash line arrows in FIG. 1, and includes ambient air admitted through an open work grille 36 in the trailing portion of the condenser section, and from the front down through the upwardly open area 38 at the generally central part of the unit and through the forward coil 30.

Figure 1:
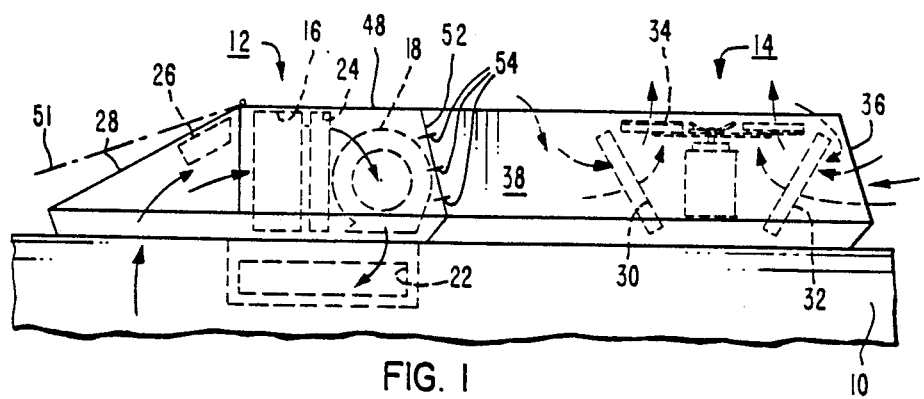
FIG. 1 is a partly diagrammatic side view of a unit on a bus for the purpose of generally showing the locations of the main components of the unit.

Before passing from FIGS. 1 and 2 to specific details of the unit, several general features of the invention will be noted. An important part of the invention is the upwardly open space 38, which in the described embodiment is the forward part of the condenser section and is bounded at the front by the air conditioning section 12, at the rear by the forward condenser coil 30, and at the opposite sides by the forward parts of the side panels 40 and 42 of the condenser section. This open area 38 provides a very convenient location for a service man or others to stand on the roof of the bus at the central part of the unit to facilitate access to the condenser fans 34 and their associated motors to the rear upon removal of the detachable top panels 44 and 46. To obtain access from above to the air conditioning or evaporator section 12 from the standing location 38, the top panel 48 is hinged at several locations 50 along its forward edge so that the panel may be swung forwardly to its dash line position 51 as shown in FIG. 1 to thereby give access from the top to the evaporator coil 16 and the evaporator fans and motor 18 and 20, respectively.

It is also noted that the two separate sections 12 and 14 are of a character which permits shipping them separately and joining them at the location where the unit is to be applied to the bus. The jointure line is indicated by the numeral 52 in FIG. 1 and the sections are bolted together as at 54.

Turning now to FIG. 3, the evaporator or air conditioning section 12 includes what is herein termed a first enclosure part formed by the sloping front wall 28, a rear wall 56 and the opposite side walls 58 which are assembled to each other in substantially water tight relation, as by welding along all of the connecting joints. The upwardly open part of the section is bounded at the front and the two opposite sides by upwardly open channels 60 (also see FIG. 5) into which the depending front and side edge flanges of the hinged door 48 is received when the door is closed. The channels 60 form a continuous trough and are open at the rear ends of the side troughs so that water received in the troughs will drain therethrough and into the central open part 38 of the unit. The water tight character of the first enclosure part of the section, coupled with the provision for passing rain water and such which descends upon the unit to the rear of the evaporator section prevents for the most part the entry of any significant amount of moisture into the evaporator section.

One of the significant features of the invention is the provision of what is herein termed first side spaces 62 at the opposite sides of the evaporator section, and to which ready access may be had by the removal of detachable panel means which, in the illustrated embodiment in FIG. 3 include a triangular panel 64 and a generally rectangular panel 66 for each of the opposite sides of the section. While the detachable panel means may be fastened in various ways, in the illustrated embodiment the triangular panel 64 makes an end slip connection along its top and bottom edges by simply slipping it forwardly, and the panel 66 may have a similar end slip sheet metal joint connection along its lower edge and be held along its upper edge by any of various fasteners.

The side spaces 62 for the evaporator section 12 are convenient to provide space for the routing of various refrigerant and other lines such as the liquid line 68 to the expansion valve 70, water lines 71, one of which is connected to the water control valve 72, all of these lines being adapted to be supported at one end by a connector plate 74 mounted to the section at its rear so that connections may conveniently be made from corresponding lines coming from the condenser section. The side space opposite that from the one having the enumerated lines is provided with the suction gas line 76 which leads from the evaporator coil 16 to the rear portion of the air conditioning section.

Figure 4:
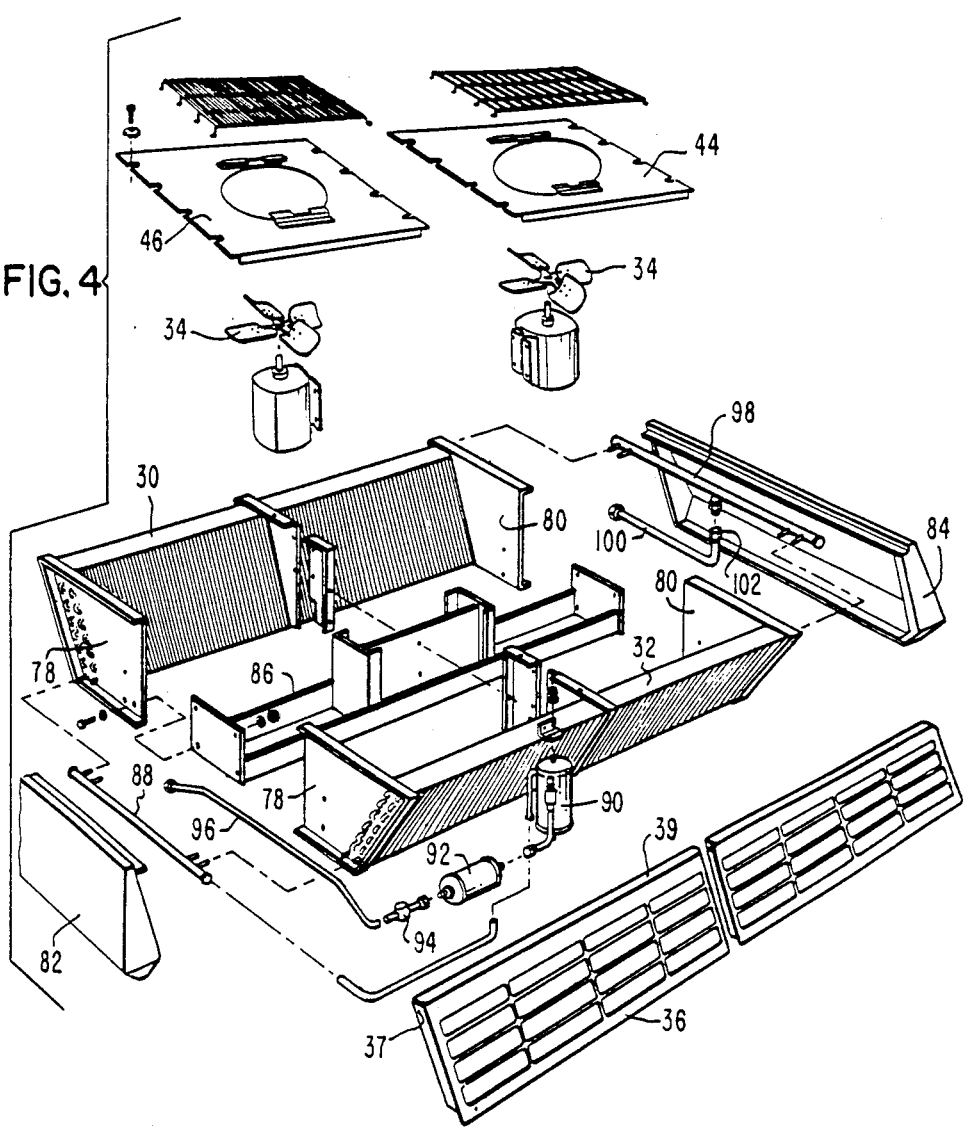
FIG. 4 is an exploded isometric view of the condenser section, again with most of the main parts shown.

Turning now to FIG. 4, the independent frame and panel means for the condenser section include the pair of left side plates 78 at the left end of the two condenser coils 30 and 32, the pair of right side plates 80 at the right ends of the two condenser coils, the left detachable panel 82 and the right detachable panel 84, these panels having a construction so that second side spaces are defined between the respective plates and panels on each side of the condenser section. The plates 78 and 80 are bolted to the central fan motor base 86 to which the condenser fan motors are also mounted.

It will be seen from both FIGS. 1 and 4 that the condenser coils 30 and 32 extend transverse to the direction of vehicle movement, and that the coils are oriented in oppositely-slanted relation to each other with the spacing between them increasing in an upward direction.

The second side space at the left of the condenser provides room for the refrigerant outlet manifold 88 which is connected to the refrigerant receiver 90 which has an outlet connected through a dehydrator 92 and sight glass 94 which in turn is connected to the liquid line 96 which passes through the left side space of the condenser section for connection to the appropriate line of the air conditioning section.

The refrigerant gas inlet manifold 98 connects to the right hand ends of the two coils 30 and 32 with the refrigerant gas being delivered to the manifold or header 98 through the inlet pipe 100 which has a swivel connection at 102 with the manifold. With the detachable panel arrangement along with the swivel, when the panel is removed the inlet pipe can be positioned to extend either forwardly or rearwardly in the second side space.

With the side spaces available along both sides of the unit for its length, and the rear space available between the oppositely inclined rear coil 32 and the air inlet grille 36, there is substantial flexibility in running the suction and discharge refrigerant lines to any particular location through those spaces for a connection to lines which extend to the remote compressor. The rear space between the coil 32 and grille 36 is also convenient for locating the elements such as the receiver and dehydrator. At the same time, with the detachable character of all of the panels and the grille (which is hinged along its upper edge as at 37), ready access can be had to all these spaces for service and maintenance of any part therein. This, coupled with the convenient central standing space 38 providing access to the top parts of both the evaporator section and the condenser section results in relatively easy access to all parts which may require maintenance and service.

The provision of the two condenser coils in their inclined relation to each other results in the provision of adequate coil face area without increasing the height of the condenser section beyond that of the evaporator section, and also provides space at the rear for the refrigerant components and lines.

The provision of the hinged top cover 48 (FIGS. 1 and 2) for the evaporator section, and the two separate top covers 44 and 46 for the condenser section provides easy manipulation and removal of these parts for access, in contrast with some prior art units of which I am aware of which the entire upper surface is covered by a single panel which may be in the order of six feet by eight feet so as to result in significant difficulty in handling.

The grille 36 has a forwardly-directed upper flange 39 which, with the grille installed, is higher than the condenser top panels 44 and 46 so that with the bus moving, air is scopped down into the space between the rear coil and grille to insure against an unduly low pressure condition when the bus is moving.

By concentrating all of the manipulatable controls at control panel 26 in the forward part of the air conditioning section, ready access to all of these controls may be had by the bus operator from a location in the bus and below the air conditioning section by removing the return air filter.

I claim:

1. An air conditioning unit for on the roof of a vehicle, such as a passenger bus, comprising:
   a vehicle air conditioning section comprising a first enclosure part including front, rear and opposite sidewalls assembled to each other in substantially water tight relation and housing evaporator coil means, evaporator fan means for circulating air from the vehicle interior for conditioning and returning it to the interior, an openable top panel in substantially water tight relation on said first enclosure part, and detachable side panel means spaced outboard of each of said opposite sidewalls to provide first side spaces therebetween;

a condenser section, physically separate from said air conditioning section, and having an independent frame and panel means forming a separate housing containing condenser coil means, and condenser fan means for circulating ambient air through said condenser coil means;

means for attaching said sections together to form the unit with said air conditioning and condenser sections spaced apart to provide a generally central part of said unit which is upwardly open over an area sufficiently extensive to provide standing room on said roof for a person to permit working on the unit from the central part.

2. A unit according to claim 1 wherein:
said unit is disposed on said vehicle roof with said air conditioning section forwardly of said condenser section.

3. A unit according to claim 2 wherein:
said condenser section includes two condenser coils, spaced apart in front-to-rear direction, and extending transverse to the direction of vehicle movement, said condenser fan means being located between said coils and disposed to discharge air upwardly, said condenser section housing including first condenser air inlet opening means in its trailing portion to admit ambient air to the rear coil, and second condenser air inlet opening means forwardly of the forward coil and fronting on said generally central part to admit ambient air to said forward coil.

4. A unit according to claim 3 wherein:
said condenser section includes openwork grille means providing said first air inlet opening means, the upper edge of said grille means including means for scooping air for said rear coil when said bus is moving.

5. A unit according to claim 3 wherein:
said condenser coils are oriented in oppositely-slanted relation to each other with the space in between them increasing in an upward direction.

6. A unit according to claim 1 including:
means hingedly securing said top panel along its forward edge to said first enclosure part; and
said first enclosure part includes upwardly open channel means disposed to receive the front and side edges of said panel, said channel means being joined to form a continuous trough along the front and side edges, and open at the rear of the two side channels to carry water to said open central part of said unit.

7. A unit according to claim 1 including:
said first enclosure part includes hot water heater coil means.

8. A unit according to claim 1 wherein:
said independent frame and panel means for said condenser section includes opposite side plates at the opposite ends of said condenser coil means, and detachable opposite side panels disposed outboard from said side plates to provide second side spaces therebetween;
said side spaces of said air conditioning section and said condenser section accommodating the routing of refrigerant and electrical lines along the sides of said units.

9. A unit according to claim 8 including:
refrigerant gas inlet header means in one of said second side spaces connected to said condenser coil means; and
a refrigerant gas inlet pipe connected to said header means in swivel relation thereto to permit said inlet pipe to be positioned to extend either forwardly or rearwardly in said second side space.

* * * * *